United States Patent
Aubry et al.

(10) Patent No.: US 9,766,706 B2
(45) Date of Patent: Sep. 19, 2017

(54) CONTROL OF ACTUATORS ON A SENSITIVE COMMAND SURFACE WITH HAPTIC FEEDBACK

(71) Applicant: DAV, Créteil (FR)

(72) Inventors: Anthony Aubry, Créteil (FR); Stéphane Vanhelle, Créteil (FR)

(73) Assignee: DAV, Créteil (FR)

( * ) Notice: Subject to any disclaimer, the term of this patent is extended or adjusted under 35 U.S.C. 154(b) by 0 days.

(21) Appl. No.: 15/103,333

(22) PCT Filed: Dec. 15, 2014

(86) PCT No.: PCT/FR2014/000280
§ 371 (c)(1),
(2) Date: Jun. 10, 2016

(87) PCT Pub. No.: WO2015/086927
PCT Pub. Date: Jun. 18, 2015

(65) Prior Publication Data
US 2016/0320844 A1    Nov. 3, 2016

(30) Foreign Application Priority Data

Dec. 13, 2013   (FR) .................................. 13 02926

(51) Int. Cl.
*G06F 1/00* (2006.01)
*G06F 3/01* (2006.01)
(Continued)

(52) U.S. Cl.
CPC .............. *G06F 3/016* (2013.01); *B60K 37/06* (2013.01); *G06F 3/041* (2013.01); *G06F 3/0416* (2013.01); *G06F 2203/04104* (2013.01)

(58) Field of Classification Search
CPC ........ G06F 3/016; G06F 3/041; G06F 3/0416; G06F 2203/04104; B60K 37/06
(Continued)

(56) References Cited

U.S. PATENT DOCUMENTS

| | | | |
|---|---|---|---|
| 2008/0064499 A1* | 3/2008 | Grant ...................... | G06F 3/016 463/36 |
| 2012/0050198 A1* | 3/2012 | Cannon ................. | A63F 13/245 345/173 |
| 2012/0232780 A1 | 9/2012 | Delson et al. | |

FOREIGN PATENT DOCUMENTS

| | | | |
|---|---|---|---|
| EP | 2320308 A1 | 5/2011 | |
| EP | 2590067 A2 | 5/2013 | |

(Continued)

OTHER PUBLICATIONS

International Search Report issued in corresponding application No. PCT/FR2014/000280 mailed Dec. 16, 2015 (6 pages).
(Continued)

*Primary Examiner* — Daryl Pope
(74) *Attorney, Agent, or Firm* — Osha Liang LLP

(57) ABSTRACT

The invention relates to a device (1) for controlling a group of actuators (2) of a sensitive command surface with haptic feedback of a motor vehicle apparatus, said group of actuators including at least one first actuator and one second actuator, said control device comprising an electronic card (11) and a switching means (12) connected to the electronic card. The reception of touch information (S) by the electronic card leads to the selection of the first actuator by the switching means.

8 Claims, 1 Drawing Sheet

(51) Int. Cl.
*B60K 37/06* (2006.01)
*G06F 3/041* (2006.01)

(58) Field of Classification Search
USPC .......................................... 340/407.1, 407.2
See application file for complete search history.

(56) References Cited

FOREIGN PATENT DOCUMENTS

FR 2922035 A1 4/2009
FR 2961610 A1 12/2011

OTHER PUBLICATIONS

Written Opinion of the International Searching Authority issued in corresponding application No. PCT/FR20141000280 mailed Dec. 16, 2015 (7 pages).

\* cited by examiner

CONTROL OF ACTUATORS ON A SENSITIVE COMMAND SURFACE WITH HAPTIC FEEDBACK

TECHNICAL FIELD OF THE INVENTION

The invention relates to the field of man-machine interfaces offering haptic feedback, mainly for a motor vehicle.

The invention relates to a device for controlling at least two actuators of a sensitive control surface with haptic feedback and a method for controlling at least two actuators of a sensitive control surface with haptic feedback.

PRIOR ART

The principle of haptic feedback is to provide feedback, generally vibratory feedback, in a man-machine interface, referred to as the interaction area. Haptic feedback is generally vibratory, but it may also involve electric interaction phenomena.

The interaction area refers to the area where interaction takes place between a finger/hand/object imitating touch and a sensitive capacitive or resistive surface, for example. In the case of a touchscreen of a motor vehicle, for example, the interaction area may be an area where a radio adjustment icon appears; a "slider" area allowing the volume of the radio to be increased. In the case of an automobile air conditioning control screen, referred to as an "automobile control panel", the interaction area may correspond to the demisting pictograms, a rotary button.

The different interaction areas of a motor vehicle are generally distanced from one another. Thus, the implementation of haptic feedback on these different areas requires the use of a plurality of actuators, or, in the case of localized haptics, the use of one actuator for each interaction area.

The disadvantage of this solution is the cost incurred by the presence of a large number of actuators but, above all, by the presence of as many electronic cards necessary for controlling the actuators as there are actuators.

PRESENTATION OF THE INVENTION

The invention aims to overcome all or some of the disadvantages of the prior art identified above, and notably to propose means for reducing the cost associated with the control of the actuators.

In this design, one aspect of the invention relates to a device for controlling a group of actuators of a sensitive control surface with haptic feedback of a motor vehicle apparatus, said group of actuators comprising at least a first actuator and a second actuator, said control device comprising an electronic card and a switching means connected to the electronic card, the reception of touch information by the electronic card causing the selection by the switching means of the first actuator. Once the first actuator is selected by the switching means, a haptic signal generated by the electronic card can be sent to the first actuator in order to power it and define the feedback generated by the actuator. This is generally vibratory feedback, having characteristics in terms of waveform, frequency and time period.

The use of a switching means allowing a single electronic card to activate one actuator of the group of actuators reduces costs in two respects:

firstly by limiting the number of electronic cards or control cards of the sensitive control surface with haptic feedback. In fact, a single electronic card is now associated with a plurality of actuators;

but also by no longer activating all of the actuators of a sensitive surface to produce haptic feedback, but a single actuator according to an interaction area, i.e. touch information received by the electronic card. In fact, a haptic signal may comprise coordinate information corresponding to the interaction area "touched" by a user or object.

Touch information in the context of the present application is understood to mean signal information corresponding to the touch of a user or of an object on the sensitive surface. A haptic signal in the context of this application is understood to mean a supply signal of an actuator (waveform, frequency, time period) which defines the feedback, for example vibration, generated by the actuator.

Apart from the main characteristics that have just been mentioned in the preceding paragraph, the method/device according to the invention may have one or more additional characteristics from the following, considered individually or according to the technically possible combinations:

the electronic card comprises a clock storing a first time period during the simultaneous reception by the electronic card of a first touch information element and a second touch information element, the first actuator being selected by the switching means during the first time period, the second actuator being selected by the switching means when the first time period has elapsed;

the electronic card comprises a clock in which a first time value is stored during the reception of touch information, one actuator from the group of actuators being selected by the switching means in a repeated manner according to a time interval corresponding to the first time value;

the switching means is a multiplexer. It may, for example, be an NXP 74HC4052 circuit;

the electronic card is connected to a power supply source.

The invention also relates to a method for controlling, by means of a control device according to any one of the preceding claims, a group of actuators of a sensitive control surface with haptic feedback of a motor vehicle apparatus, said group of actuators comprising at least a first actuator and a second actuator, said method comprising:

a first step of reception and analysis by the electronic card of touch information;

a second step of sending by the electronic card of control information to the switching means, said control information designating the first actuator;

a third step of switching of the switching means to the first actuator.

BRIEF DESCRIPTION OF THE FIGURES

Other characteristics and advantages of the invention will become evident from a reading of the description that follows, with reference to the attached figures, wherein.

For greater clarity, identical or similar elements are indicated by identical reference numbers in all figures.

DETAILED DESCRIPTION OF AN EMBODIMENT

Figure 1:
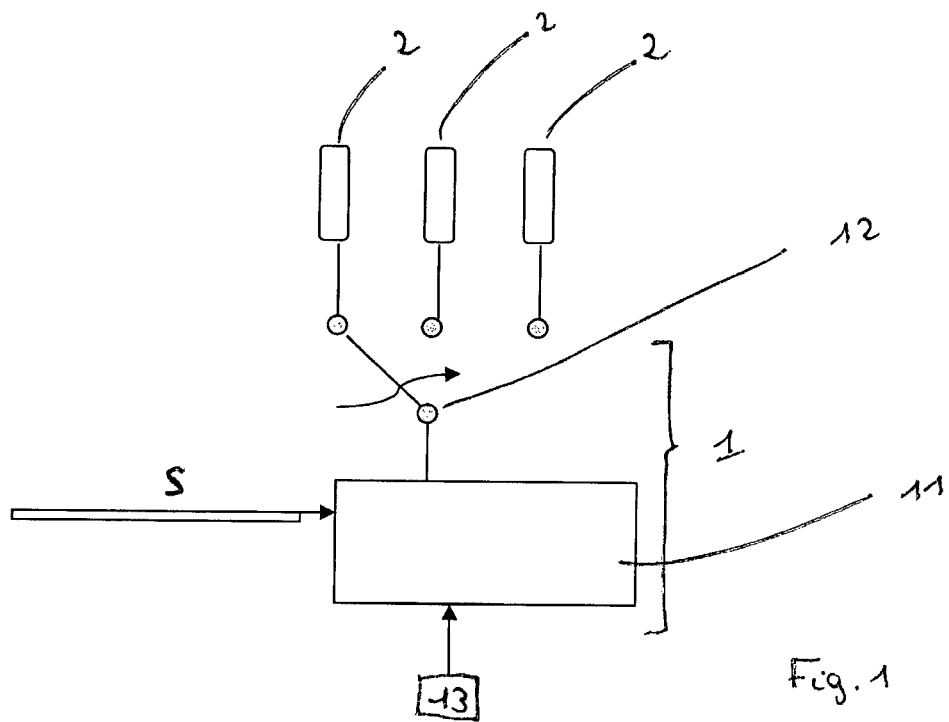
FIG. 1 shows a schematic view of a control device according to one embodiment of the invention.

FIG. 1 shows a schematic view of a device 1 for controlling three actuators 2 of a sensitive control surface with haptic feedback. The control device 1 comprises an electronic card 11, or control card, and a switching means 12, for example a multiplexer. The electronic card 11 is connected to a power supply source 13. The electronic card can receive touch information S at its input. The touch information S corresponds to a touch of a user, or of an object simulating the touch of a user, on the sensitive control surface in an interaction area. Each actuator corresponds to one interaction area and each touch information element corresponds to one interaction area. Thus, the reception by the electronic card of touch information S causes the selection by the multiplexer of the actuator corresponding to the received touch information and therefore to the activated interaction area. The programming of the components of the electronic card allows an actuator to be associated with each touch information element, and therefore with each interaction area. A single electronic card 11 is thus used to control a plurality of actuators, allowing system costs to be reduced.

When a user touches two functional areas simultaneously, each area corresponding to a different actuator, a time delay in sending haptic effects can be managed by the control device. In fact, the electronic card 11 comprises a clock storing a first time period during the simultaneous reception by the electronic card 11 of a first touch information element and a second touch information element. This first time period corresponds to the time delay between the, for example vibratory, feedbacks, of the first and second actuators, corresponding to the first touch information element and to the second touch information element respectively. Thus, during the simultaneous reception of the first and second touch information elements by the electronic card, the first actuator is selected by the switching means and is therefore supplied by the power supply source 13 during the first time period then, at the end of the first time period, the second actuator is selected by the switching means.

The presence of the switching means allowing the control of a group of actuators 2 by a single electronic card 11 also allows the generation of haptic effects of the surface wavelet type. Thus, during the reception of touch information by the electronic card, a first time value can be stored in a clock of the electronic card and an actuator from the group of actuators is selected by the switching device in a repeated manner according to a time interval corresponding to said first time value.

Figure 2:
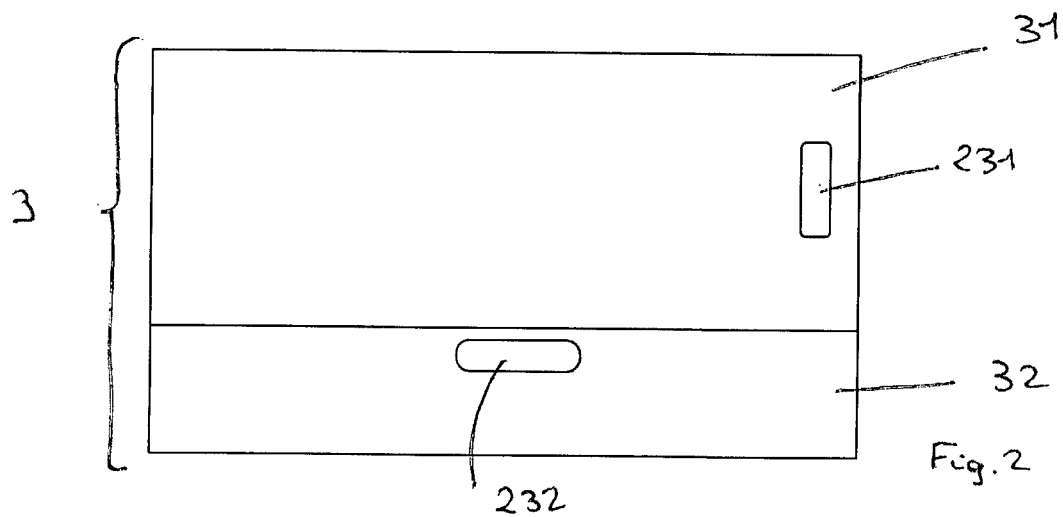
FIG. 2 shows a schematic view of an automobile front area comprising a sensitive control surface with haptic feedback.

FIG. 2 shows a control panel front area 3 of a motor vehicle, comprising a first functional area 31 of the touch-screen type and a second functional area 32 comprising direct-access buttons (for controlling the air conditioning, for example). The first area 31 comprises a first actuator 231 and the second area 32 comprises a second actuator 232. This offers a good compromise between the performance of the touch-sensitive surface and the implementation cost. The first actuator 231 and the second actuator 232 are selected by the same switching means connected to the same electronic card.

Figure 3:
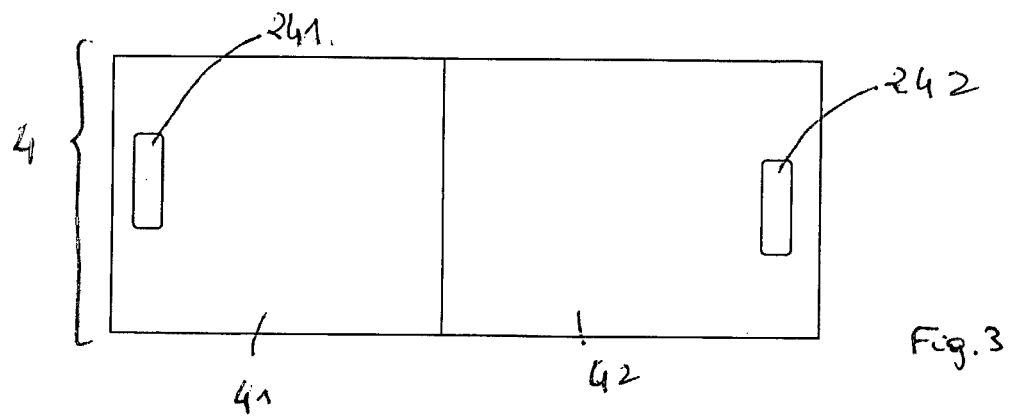
FIG. 3 shows a schematic view of a different automobile front area comprising a sensitive control surface with haptic feedback.

FIG. 3 shows a control panel front area 4 of a motor vehicle. In this configuration, the automobile front area has a considerable size. Thus, the front area 4 is divided into a first functional area 41 and a second functional area 42. The first area 41 comprises a first actuator 241 and the second area 42 comprises a second actuator 242. This division allows the use of actuators based on ERM, a low-cost technology. The first actuator 241 and the second actuator 242 are selected by the same switching means connected to the same electronic card.

The invention is not limited to the embodiments previously described with reference to the figures, and variants could be envisaged without exceeding the scope of the invention.

The invention claimed is:

1. A device for controlling a group of actuators of a sensitive control surface with haptic feedback of a motor vehicle apparatus, said group of actuators comprising at least a first actuator and a second actuator, said control device comprising:
    an electronic card; and
    a switching means connected to the electronic card;
    wherein the reception of touch information by the electronic card causes the selection by the switching means of the first actuator,
    wherein the electronic card comprises a clock that stores a first time period during which a first touch information element and a second touch information element is simultaneously received by the electronic card, wherein the first actuator is selected by the switching means during the first time period, wherein the second actuator is selected by the switching means when the first time period has elapsed.

2. A device for controlling a group of actuators of a sensitive control surface with haptic feedback of a motor vehicle apparatus, said group of actuators comprising at least a first actuator and a second actuator, said control device comprising:
    an electronic card; and
    a switching means connected to the electronic card;
    wherein the reception of touch information by the electronic card causes the selection by the switching means of the first actuator,
    wherein the electronic card comprises a clock in which a first time value is stored during the reception of touch information, wherein one actuator from the group of actuators is selected by the switching means in a repeated manner according to a time interval corresponding to the first time value.

3. The control device as claimed in claim 1, wherein the switching means is a multiplexer.

4. The control device as claimed in claim 1, wherein the electronic card is connected to a power supply source.

5. A method for controlling, by a control device according to claim 1, a group of actuators of a sensitive control surface with haptic feedback of a motor vehicle apparatus, said group of actuators comprising at least a first actuator and a second actuator, said method comprising:
    a first step of reception and analysis by the electronic card of touch information;
    a second step of sending by the electronic card of control information to the switching means, said control information designating the first actuator;
    a third step of switching the switching means to the first actuator.

6. The control device as claimed in claim 2, wherein the switching means is a multiplexer.

7. The control device as claimed in claim 2, wherein the electronic card is connected to a power supply source.

8. A method for controlling, by a control device according to claim 2, a group of actuators of a sensitive control surface with haptic feedback of a motor vehicle apparatus, said group of actuators comprising at least a first actuator and a second actuator, said method comprising:
    a first step of reception and analysis by the electronic card of touch information;

a second step of sending by the electronic card of control information to the switching means, said control information designating the first actuator; and a third step of switching the switching means to the first actuator.

* * * * *